106. COMPOSITIONS, COATING OR PLASTIC.

83

UNITED STATES PATENT OFFICE.

MICHAEL J. WALSH, OF PHILADELPHIA, PENNSYLVANIA.

COATING COMPOSITION.

1,415,282.  Specification of Letters Patent.  Patented May 9, 1922.

No Drawing.  Application filed March 9, 1920.  Serial No. 364,392.

*To all whom it may concern:*

Be it known that I, MICHAEL J. WALSH, a citizen of the United States, and a resident of the city of Philadelphia, county of Philadelphia, State of Pennsylvania, have invented certain new and useful Improvements in Coating Compositions, of which the following is a specification.

My invention relates to a coating composition of the class to which lacquers, varnishes and similar substances pertain and is of special utility for coating the surfaces of various materials such as metal, wood, fabrics, compositions, glass and the like.

Among the objects of my invention is to provide a composition of matter adapted to be used as a coating or covering for finished surfaces of any article or object to protect the same and to give them luster to render porous surfaces, such as wood, impervious, to prevent the tarnishing of metals; to provide a resistant to weather conditions, particularly moisture, heat and cold; to give a bright sparkle and brilliancy to articles of clear or transparent material such as glass, precious and semi-precious stones; and generally to provide means whereby the surfaces are improved in appearance, made more permanent and less liable to scotching, and the fading or changing of the colors to a considerable extent lessened.

Another object is to provide a composition of matter, with the above mentioned characteristics, adapted for use in the same way as a lacquer or varnish is utilized, to coat and protect the finely finished surfaces of pieces of furniture, such as chairs, pianos, talking machines, cabinets, bookcases, desks, dressers, tables, articles, such as mirrors, windows, especially the glass thereof, automobiles, particularly the surface of the body and the fenders thereof, as well as the wind shield thereof, and the like; lamps and their stands, telephone instruments, toilet articles, baskets, glass and the like, in fact, all finished surfaces capable of taking a coating.

Other objects of my invention will more fuly appear in the following specification.

In the manufacture of my improved coating composition I have found that I may combine the following ingredients substantially in the proportions indicated and obtain a highly satisfactory product:

5 ounces of sulphuric acid, 12 ounces of whiting, 5 ounces of powdered gum rosin, 5 ounces of white petrolatum, 1¼ pints of white mineral oil, 1¼ pints of silicate of sodium, ¾ gallons of kerosene oil, and a suitably small quantity of deodorizer such as oil of lemon cress, wintergreen or the like.

The above is illustrative merely of the proportions that may be used, as the total quantity prepared may, of course, be unlimited and the particular amounts indicated above varied, as requirements may demand. The white mineral oil which is known as "veume white mineral oil" in the trade is 32.3 to 32.5 Baumé, flash 390, and viscosity 175 to 180, and the sodium silicate is a solution of sodium silicate containing from 37½% to 38% of silicate of sodium, the balance being water.

In preparing the compound I find that the same may be obtained by agitating the ingredients in a vat or suitable container, provided with an appropriate form of agitator therein, and thoroughly mixing the constituents. The constituents are placed in the container, preferably in the order mentioned below, to wit.

White mineral oil, white petrolatum, powdered gum rosin, silicate of sodium, kerosene oil, sulphuric acid, whiting, and the deodorizer or deodorizers, the agitator being in continual operation.

After the mixture is thoroughly mixed the same is permitted to rest and settle in order that suspended foreign matter may be deposited at the bottom of the container. The clear solution or mixture may then be gradualy siphoned off into a second vat or container in which is also included a suitable agitator operating to agitate the siphoned mixture as it is gradually caused to flow into said second container. This solution or mixture may be drawn off from the bottom of the second vat or container through a filter, such as a filter cloth (cheese cloth) and then passed through a filling device into bottles. If desired a filter may be utilized between the first and second vats or containers, whereby the use of the filter between the second vat or container and the bottles may be omitted and the mixture from the second container directly fed to the bottles.

The composition is in liquid form of comparatively small viscosity, transparent and colorless. In use the same may be applied to the surface to be coated with a cloth or damp rag, such as cheese cloth or the like, by rubbing lightly upon the surface. It is found that the best result is obtained by first cleaning the surface with any suitable substance adapted to clean the surfaces to which the composition is to be applied. A small quantity of the composition is sufficient to produce the desired result and for that reason it is economical. As the composition is permitted to dry and harden it forms a hard and tough coating, protecting the surface for a long period of time before requiring renewal. Surfaces to which this composition is applied are made to appear more brilliant and to have a beautiful luster. It will withstand ordinary weather conditions by protecting the surface from the changes that weather conditions usually produce and also has strong tendencies to resist the adherence of liquids, such as water or moisture. When applied to articles such as gems, precious and semi-precious stones and the like the same are given a brilliant sparkle. When applied to polished surfaces of articles of furniture, such as pianos, talking machines and so forth, the surface thereof will be very lustrous, resist ordinary scratches, prevent the formation of mildew and the like, as well as to make the refinishing of the surfaces unnecessary. Examples of the use of this composition may be multiplied indefinitely, the above being mentioned as illustrative of some of the uses to which it may be put.

The order in which the ingredients are added to and mixed in the first container may be varied but I have found that a very desirable result is obtained when the order followed is that as indicated above. The deodorizer may be omitted, if desired, but it is found that the presence of the same gives the composition a pleasant odor, any particular odor being chosen as desired.

Having thus described my invention what I claim as new and desire to protect by Letters Patent is:

1. A coating composition comprising a liquid component resulting from the admixture of sulphuric acid, whiting, gum rosin, petrolatum, mineral oil, sodium silicate and kerosene.

2. A coating composition comprising a liquid component resulting from the admixture of sulphuric acid, whiting, gum rosin, petrolatum, mineral oil, sodium silicate, kerosene and a deodorizer.

3. A coating composition comprising a liquid component resulting from the admixture of sulphuric acid, whiting, powdered gum rosin, white petrolatum, white mineral oil, silicate of sodium and kerosene.

4. A coating composition comprising a liquid component resulting from the admixture of sulphuric acid, whiting, powdered gum rosin, white petrolatum, white mineral oil, silicate of sodium, kerosene and a deodorizer.

5. A coating composition comprising a liquid component resulting from the admixture of sulphuric acid, whiting, powdered gum rosin, white petrolatum, white mineral oil, silicate of sodium, kerosene and an essential oil deodorizer.

6. A coating composition comprising a liquid component resulting from the admixture in the proportions by weight of substantially five parts each of sulphuric acid, powdered gum rosin and white petrolatum, twelve parts of whiting, twenty parts each of white mineral oil and silicate of sodium, one hundred parts of kerosene oil and a minute part of a deodorizer.

7. A coating composition comprising a liquid component resulting from the admixture of substantially five ounces of sulphuric acid, twelve ounces of gum rosin, twelve ounces of white petrolatum, one and one-fourth pints of white mineral oil, one and one-half pints of a solution of sodium silicate, three-fourths of a gallon of kerosene oil and a suitably small quantity of deodorizer.

8. A coating composition comprising the liquid component resulting from the successive admixture of whiting, mineral oil, white petrolatum, powdered gum rosin, sodium silicate, kerosene oil, and sulphuric acid.

In witness whereof, I have hereunto set my hand this 8th day of March, 1920.

MICHAEL J. WALSH.